April 30, 1957 M. V. KALFAIAN 2,790,930

COLOR TELEVISION IMAGE TUBE AND SYSTEM THEREFOR

Filed Feb. 21, 1955

INVENTOR

Mgur V. Kalfaian

United States Patent Office 2,790,930

Patented Apr. 30, 1957

2,790,930

COLOR TELEVISION IMAGE TUBE AND SYSTEM THEREFOR

Meguer V. Kalfaian, Los Angeles, Calif.

Application February 21, 1955, Serial No. 489,431

6 Claims. (Cl. 315—21)

The present invention relates to color television, and more particularly to image reproducing devices in natural color. Its main object is to provide methods and means for controlling accurate synchronism between elemental primary color illuminations on the viewing screen and the elemental primary color components of the received signals, whereby faithful reproduction of colored pictures may be obtained on the viewing screen. Another object is to produce colored pictures with a relatively simple tube structure, employing a simple color screen, and a single electron beam within that tube, and an electronic synchronizing means associated therewith, for controlling color registry under normally manifested variables of time, amplitude, and amplitude geometric distortion.

Among various forms of color image reproducing screens, one of the simplest screens comprises sequential groups of parallel ruled primary-color phosphor stripes, red, green, and blue, in a direction in which the beam is deflected horizontally. The width of each phosphor stripe, and the diameter of the scanning beam is arranged equal approximately to one third the size of an image element, so that a group of three primary-color phosphor stripes are devoted to each scanning line of the raster. Selection of any of the three primary colors in a group, during each scanning line, is then achieved by transverse scanning of the adjacent stripes periodically at the rate of the highest frequency occuring in the transmission of video signals. In order to attain correct coincidence of primary-color signal to instantaneous position of the beam upon a primary color stripe, a servo-controlling arrangement is usually provided with the system. Various arrangements for servo-controlling the instantaneous beam position upon the raster have been proposed previously, but to date, these arrangements have either proven to be extremely complicated, or, unsatisfactory for accurate performance.

One servo-controlling arrangement noteworthy to mention may be referred to an article by Bond et al., in RCA Review, pp. 542–565, vol. XII, No. 3, September 1951, part II. For comparison purposes, however, a brief summary may be made as follows: The servo-control signals are derived from a series of rectangular secondarily-emissive conductor strips arranged in vertical column at one end of the horizontal phosphor stripes. With the assumption that in each group of phosphor stripes the centrally located stripe is of the green primary color, there is included a rectangular metallic strip at the front end, and in horizontal plane, of the blue primary color phosphor stripe, and also, a similar metallic strip at the front end, and on the axis of the corresponding red phosphor stripe. The vertical column of the rectangular metallic strips adjacent the blue phosphor stripes are displaced horizontally away from the metallic strips adjacent the red phosphor stripes, by a distance equal to the width of a metallic strip, so that an output pulse generated by any one of the metallic strips adjacent the red phosphor stripes by the scanning beam will be produced at a later time period than when a pulse is generated by any one of the metallic strips adjacent the blue phosphor stripes. The distance of horizontal line scanning of the beam is arranged to include said column of rectangular secondarily emissive strips, so that at the beginning of each line scanning, the beam either strikes one or two metallic strips to derive control voltages, or, passes directly between two strips (adjacent red and blue stripes) when accurate color registry is established. The color selection during a line scanning is established by a stair step voltage applied to an auxiliary vertical deflection means (electrostatic deflection plates), the amplitude of which is preadjusted to cause the beam scan three phosphor stripes, in a group, sequentially. The auxiliary vertical deflection is switched off during the interval of the scanning beam traveling in the area of said column of metallic strips. Thus for each line scansion, if the beam starts centrally coincident with the green phosphor stripe, no control signal is generated to deflect the beam vertically. On the other hand, if the beam starts below or above this desired position, the metallic strip in that path generates an output signal having a magnitude dependent upon the departure from the axis of the green phosphor stripe. Thus, according to the magnitude of output signal derived, an opposition voltage is applied to the auxiliary pair of electrostatic vertical deflection plates for adjusting the normal angular path of the beam.

Good color registry has been obtained with this type of servo control, but first, the circuitry involved has so far been extremely complicated, and second, servo control signals are derived only at the beginning of the scanning line, and left in free state to chance errors thereon. In order to achieve the required servo-control adjustments, the system comprises pulse shaping circuitry; delay lines; phasing networks; clamp circuits; gates; and gate amplifiers, which in combination render the system impractical. Including these undesired conditions, the horizontal positioning of the raster must be normally moved toward the said column of secondarily emissive targets, with ample allowance to overcome line width and positioning variations, and in conjunction, a considerable portion of the video signals at the beginning of each line scanning must be blanked out to obtain undisturbed servo-control signals, which obviously cuts off a noticeable part of the picture.

In view of the difficulties encountered in previously proposed servo systems, as described above, a simple and accurate means for automatically controlling the path of the beam from center-to-center distance between adjacent phosphor stripes in a group, during each scanning line, is therefore, highly desirable, and accordingly, the main object of this invention is to provide a color-image reproducing screen, having self-contained means for the production of continuous servo signals during each line scansion of the image forming raster.

In the preferred embodiment of this invention, the color screen consists of sequential groups of parallel ruled primary color phosphor stripes, in a direction in which the beam is deflected horizontally. Between each group of phosphor stripes there is included a conductor strip, for example, in the form of a thin metallic wire, which is arranged to produce a negative potential whenever the scanning beam impinges upon it. These metallic strips are electrically connected to the accelerating anode through an impedance having high resistive value. Thus, when the scanning beam impinges upon any one of these metallic strips, there will be developed a negative potential across the resistor. This resistor is shunted by a capacitor, and further connected to a pair of auxiliary vertical deflection plates, for guiding the scanning beam in vertical direction.

In operation, the arriving primary color video signals are first gated into sequential application upon the intensity control grid of the scanning beam, at a prearranged frequency rate, and in synchronism with this gating sequence a stair step (an approximation of stair step wave) voltage is applied upon the auxiliary vertical deflection plates, in preassigned amplitude to limit the peak-to-peak vertical deflection equal to a group of three phosphor stripes. The normal amplitude of vertical scanning is so pre-adjusted that a greater number of phosphor stripes are scanned in a field period, than the standard number that is preassigned to it; thus causing the scanning beam to normally rush downwards on the phosphor stripes at all times during vertical sweep. In a typical example, assuming that at the start of a line scanning the normal angular path of the beam is not coincident with the centrally located phosphor stripe in a group, the auxiliary stair step vertical deflection will cause the beam to strike the closest metal strip, which in turn generates an opposition voltage across the auxiliary electrostatic beam deflection plates, to move the beam upwards to a position just grazing said conductor strip coincident with the lower lobe of the stair step wave. Due to the fact that a storage element is included in the circuit arrangement, most part of the servo-control voltage will remain undisturbed during the line retrace period, so that at the beginning of the following scanning line a height-control potential is preserved; with further adjustment to be established during that line. At the end of a field scanning, the stored height-control potential is dissipated by a normally inoperative discharger element, which is activated at that time by the vertical retrace pulse in positive polarity; normally available in conventional television receivers.

In order to provide operation of the servo-system continuously, during black level of the raster, the normal bias upon the intensity control grid of the cathode beam is so adjusted that a low level beam current flows at all times during each line scanning. This tends to produce a light background of the reproduced picture, but it may be visually minimized by the application of opaque coating (of the proper value) upon the glass surface of the face plate. Darkening of the face plate has been previously practiced, and found very desirable in improving the picture quality by improving the linearity of grid control excitation to light emission of the cathode ray tube.

One condition that is inherent with the present system, is the large variation of beam currents (in accordance with picture modulation) encountered during each line scansion. These current variations, however, will be cancelled out in the output of servo-control voltages by the oppositely varying ratios of beam currents taken by the conductor strips. For example, when the current intensity of the arriving beam is high, the beam will just graze the metallic strip with very small portion of it impinging upon the metallic strip in developing the output servo-voltage. Whereas, when the current intensity of the beam is very low, a larger area of the beam will impinge upon the metallic strip in order to develop an output servo-voltage equal in amplitude as of the former. Thus, the beam position upon the conductor strip will inherently act as an automatic cancelling control of the large variations in beam-current modulations.

In view of the foregoing description of the present invention, and its comparative advantages accrued with respect to previously proposed servo systems for the particular purpose, the main object is therefore to provide continuous servo-control at low frequency rate, without involving complicated circuitry and critical adjustments therefore. In the drawings.

Figures 1, 3, 4:
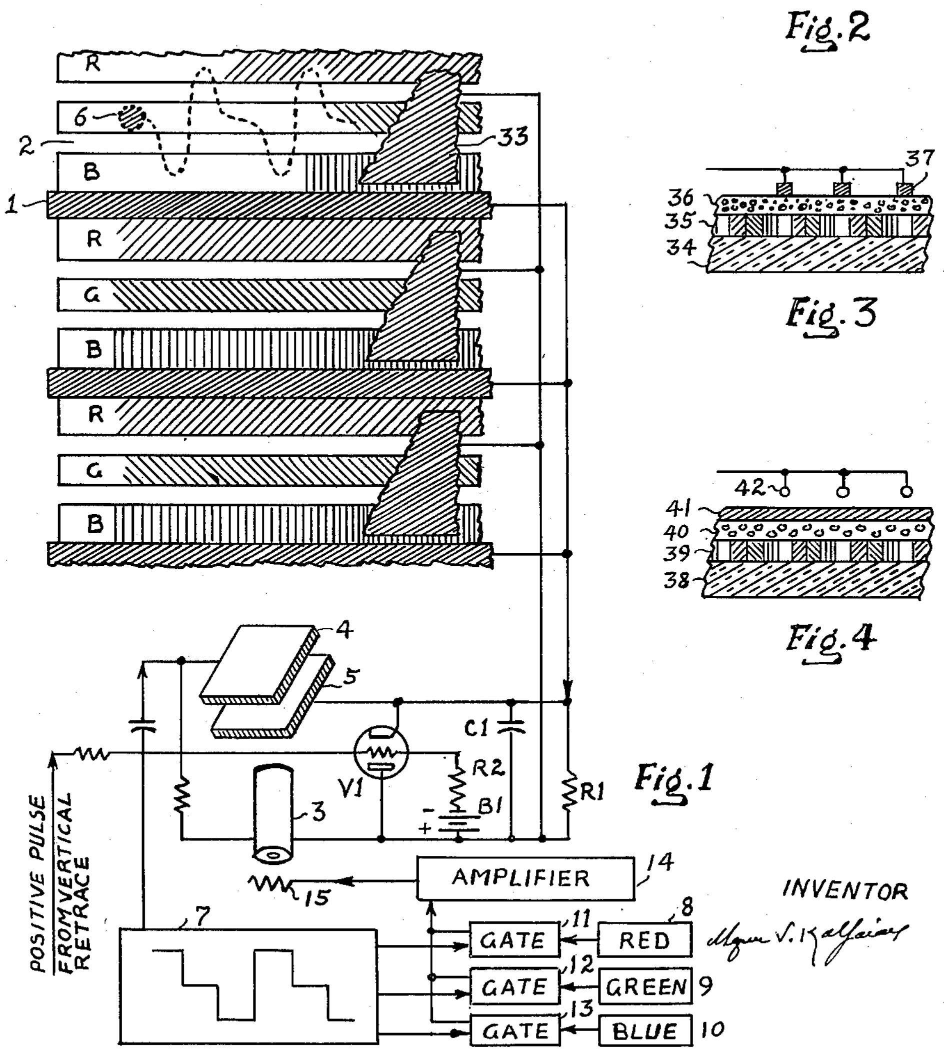
Fig. 1 represents partly diagrammatic and partly schematic arrangement of the color image forming device in accordance with the invention.
Figs. 3 and 4 are cross-sectional views of modifications of the color image forming screen in accordance with the invention.

In reference to the illustration of Fig. 1, the color image forming screen comprises a plurality of parallel ruled primary color phosphor stripes, along the lines of horizontal scanning of the raster. These phosphor stripes are arranged in sequential groups, and each group comprises, in similar order, three primary-color stripes, namely, the colors of red (R), green (G), and blue (B). Between each group is included a beam-responsive conductor strip 1. These strips are electrically connected in parallel to a common terminal in the manner as shown in the drawing, and thereon terminated to the beam-accelerating anode of the electron gun structure 3, through resistor R1, the latter of which is directly connected to a pair of vertical electrostatic beam-deflection plates 4 and 5. In this arrangement, if we assume that the secondary emission from strips 1 resulting from beam bombardment will be less than unity, then at any instant that the electron beam 6 may strike one of the metallic strips 1, a negative potential will be developed across R1, and the vertical position of the beam 6 will accordingly move upwards just grazing that particular strip. This auxiliary vertical movement of the beam may be easily accomplished by the amount of voltage that may be developed across resistor R1. An exemplary reference may be made to a disclosure in U. S. Patent 2,417,450, granted to Sears on March 18, 1947, wherein extremely large deflection voltages are developed across a resistor of 8 megohms with only 20 percent of the beam area impinging upon the auxiliary target.

With the operating conditions given above, we may now assume that the electron beam 6 scans the screen from left to right, by means of the main horizontal and vertical deflection yoke; which are omitted for clarity of drawing. A stair step voltage, or an approximation thereof, at a known constant frequency in block 7, is applied across the auxiliary beam-deflection plates 4 and 5 through coupling capacitors C3 and C4. The amplitude of this voltage is preassigned to cause peak-to-peak vertical deflection of the beam equal in distance approximately to three phosphor stripes. Thus with the assumption that the normal angular position of the beam is coincident centrally with the green primary color phosphor stripe during a line scansion, the three primary color phosphors are excited sequentially at the frequency rate of the stair step voltage wave. Such accurate beam coincidence with the phosphor stripes, however, is normally improbable, and it is assumed, as an example, that at the start of a line scansion the normal beam position will be either above or below the green phosphor stripes. With the assumption that the beam is constantly oscillated in vertical direction by the stair step wave, this kind of positioning error will cause the beam to strike a conductor strip 1, closest thereto. The resultant voltage developed across R1 will cause the beam to move upwards until at its lower lobe of vertical oscillation it just grazes the conductor strip that it had moved above. The amount of beam area that may impinge upon a conductor strip depends upon the average intensity of the scanning beam during a line scansion; but this amount of positioning variation is completely negligible in affecting the required primary color registry.

Due to the progressive error caused by the main vertical deflection yoke, storage capacitor C1 is included in parallel with the resistor R1, so that the correction servo-voltage developed at the end of one line will follow contiguously at the beginning of the following line. At the end of a field scansion, however, these accumulated servo voltages might be greatly different with respect to the starting point of field scansion, and accordingly, discharger tube V1 is included across capacitor C1. The control grid of discharger tube V1 is normally biased by source B1 to plate current cut-off, through resistor R2. In order to effect discharge of capacitor C1, a positive pulse during vertical retrace period is applied upon the control grid of V1 rendering it conductive to discharge the condenser C1. With such accurate control of line scanning, the correct sequence of the three primary color signals, blocks 8, 9 and 10, may be predetermined by the switching wave in block 7, which operates the gates 11, 12 and 13 in proper sequence, the outputs of which are amplified by block 14, and finally applied upon the beam-intensity control grid 15 of the image tube for the final reproduction of the color image on the composite screen.

In order to avoid dilution of two primary colors during transiton period of the beam passing from one primary color phosphor area to another, a blanking interval is included. This blanking may be achieved either by applying a negative pulse upon the intensity control grid 15 for beam-current cut-off, or, by the inclusion of blank or dark areas 2 between the primary-color phosphor stripes R, G and B.

Figure 2:
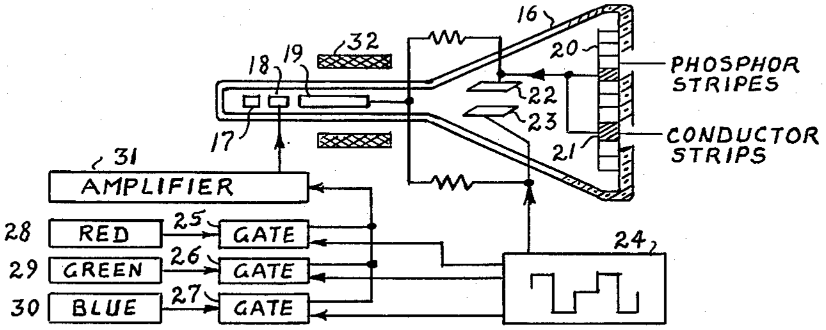
Fig. 2 represents partly block diagrams, and partly cross-sectional view of the color image forming cathode ray tube embodying the features of the invention.

To illustrate the general form of the present invention, Fig. 2 shows, partly sectional, the color image forming cathode ray tube embodying the features of the invention. The image forming tube comprises an evacuated vessel 16, having mounted therein, at one end, an electron emitting cathode 17, intensity control electrode 18 for the emitted electrons, and a cylindrical accelerating anode 19 which functions to focus the electrons emanating from the cathode into a concentrated stream projected upon the color image forming screen, disposed at the opposite end of the enclosing vessel. The color image forming screen comprises parallel ruled sequential groups of primary color stripes 20, in between each group of which is interposed a signal generating conductor strip 21. These strips are electrically connected to one side of a pair of electrostatic vertical deflecting plates 22 and 23, which serve as the beam guiding elements in accordance with the output signals received from the conductor strips 21. To this pair of deflecting plates, there is also applied a switching wave having a stair step shape, as produced in block 24, which serves as the driver of the color selection vertical motion of the beam upon the primary color phosphor stripes 20. For correct coincidence of primary color input signal to instantaneous position of the beam upon any one of the phosphor stripes, the switching wave in block 24 is applied to operate gates 25 to 27 in sequence, for converting the simultaneous primary-color signals in blocks 28 to 30 into a sequential system. These outputs of the gates are then combined and amplified in block 31 prior to application upon the beam-intensity control electrode 18. The main horizontal and vertical deflecting yoke is designated by the numeral 32, which is excited by conventional apparatus, such as utilized in conventional television receivers..

The arrangements given in Figs. 1 and 2 may be modified in various ways, few exemplary ones of which may be given as follows: The ideal stair step color switching wave as shown in block 7 may only be approximated, such as shown by the waveform on the phosphor stripes, which for example, may be obtained by the addition of a second-harmonic component having half the amplitude of a sine wave having the switching frequency, without causing image degradation. Such a wave will be found suitable to energize an electromagnetic deflection coil, replacing the electrostatic deflection plates. The output signals of conductor strips 1 may be amplified prior to application upon the deflection plates 4 and 5. The capacitor C1 may be dispensed with, if the inherent capacity of conductor strips 1 is sufficiently large for storage of the servo-voltage. The resistor R1 may be dispensed with, and the beam guiding potentials generated across conductor strips 1 may be directly accumulated across capacitor C1. A combination of electrostatic deflection plates and electromagnetic deflection coil may be utilized for the auxiliary beam deflection; the former being excited directly by the conductor strips, and the second being excited by the color switching wave. The conductor strips 1 may be coated with non-emissive material, so as to minimize secondary emission from said strips. The phosphor stripes R, G, B, may be coated with electron pervious metallic conductor 33, such as vaporized aluminum, for reflecting the luminescing image-light toward the viewing end; this conductor being electrically connected directly to the accelerating anode. Instead of phosphor stripes of different primary colors, a color film having the proper primary color filter stripes may be placed directly over the inner face of the face plate (viewing end), and on top of this film an evenly distributed phosphor coating of substantially white color applied. Over this coating, the signal generating metallic strips 1 may be placed, either by evaporation method, or stretching thin wires across it. This form is shown in cross sectional view in Fig. 3, wherein, 34 represents the face plate of the image forming cathode ray tube; 35 represents the striped primary color filter film; 36 represents white phosphor coating; and 37 represents the signal generating conductor strips. In another form, as shown in Fig. 4, 38 represents the glass face plate; 39 represents the striped primary color filter film; 40 represents white phosphor coating; 41 represents electron-pervious metallic coating; and 42 represents the signal generating conductive strips in the form of stretched wires across the screen. The output signals of the conductor strips 1 may be current-amplified and applied upon an auxiliary electromagnetic vertical deflecting coil, properly shunted by damping means. The conductor strips 1 may also be utilized for monochrome image reproducing tubes, to correct vertical geometric distortion. With these few exemplary suggestions in view, it is obvious therefore, that many modifications, adaptations and substitutions of parts of the arrangements shown may be made without departing from the spirit and scope of the invention, and accordingly, the illustrations embodied in this invention are to be considered only as exemplary showing the preferred mode of carrying into useful application.

What I claim is:

1. A color television image reproducing system comprising an image screen having sequential groups of first, second and third parallel ruled stripe-like sections, positioned in horizontal directions, and each stripe-like section in a group limited in its light reproduction to one different primary color; a beam responsive strip-like signal-generating conductor in between each of said groups, and along the lines of said stripes; means for electrically connecting said strips in parallel to a common output terminal; an electron beam; an intensity control electrode for the beam; means for deflecting the beam in horizontal and vertical directions to scan a raster on the image screen; a source or sources of first, second and third primary color image signals; means for generating a color switching wave at the highest frequency rate necessary for color image forming; means for applying said switching wave upon said source or sources of image signals in a prearranged sequence, and means therefor for applying same upon the intensity control electrode for modulating the intensity of the scanning beam; means for prearranging the widths of said stripes, and said strips, so that the total of a known number of them occupy a first vertical width of the raster; means for first-additionally deflecting the beam in vertical direction by said switching wave in synchronism with said modulation, in prearranged amplitude so as to make it impinge coincident upon the first, second and third stripes, in a group, sequentially during a horizontal line scanning; means for preadjusting the vertical width of said scanning raster to a second vertical width; and means for second-additionally deflecting the beam in vertical direction by the output signals at said common output terminal, so as to progressively vary the vertical width of said second width of the scanning raster substantially equal to the first width of said total of the stripes and strips, thereby effecting coincident line scansion with that of said stripes in said groups.

2. The system as set forth in claim 1, wherein is included separation of dark or blank stripe-like areas between said stripes, whereby to avoid dilution of two primary colors during transient period of said beam from one stripe to another.

3. The system as set forth in claim 1, wherein said stripes comprise phosphor stripes of different primary colors, whereby each phosphor stripe will luminesce in different primary color upon bombardment by said scanning beam.

4. The system as set forth in claim 1, wherein said stripes comprise primary color filter film stripes, evenly coated with phosphor material having substantially white color luminescence, whereby effecting primary-color viewing-light by said white color luminescence upon bombardment of said phosphor by said beam.

5. The system as set forth in claim 1, wherein is included electron-pervious metallic coatings over said stripes, facing said beam, whereby said coatings act as light reflectors for increasing the light output of the reproduced color image.

6. The system as set forth in claim 1, wherein said conductor strips comprise stretched conductor wires in front, facing the beam, of said color image screen.

References Cited in the file of this patent

UNITED STATES PATENTS

| | | |
|---|---|---|
| 2,457,911 | Munster | Jan. 4, 1949 |
| 2,530,431 | Huffman | Nov. 21, 1950 |
| 2,577,368 | Schultz et al. | Dec. 4, 1951 |
| 2,630,548 | Muller | Mar. 3, 1953 |
| 2,634,326 | Goodrich | Apr. 7, 1953 |
| 2,657,331 | Parker | Oct. 27, 1953 |
| 2,689,926 | Bond | Sept. 21, 1954 |